United States Patent
Jensen et al.

(10) Patent No.: US 8,397,395 B2
(45) Date of Patent: Mar. 19, 2013

(54) OPTICAL SENSOR WITH COLLISION PROTECTION FOR A MEASUREMENT MACHINE

(75) Inventors: Thomas Jensen, Rorschach (CH); Frank Saupe, Tuebach (CH); Benjamin Vullioud, Gollion (CH)

(73) Assignee: Leica Geosystems AG, Heerbrugg (CH)

( * ) Notice: Subject to any disclaimer, the term of this patent is extended or adjusted under 35 U.S.C. 154(b) by 221 days.

(21) Appl. No.: 13/062,023

(22) PCT Filed: Aug. 28, 2009

(86) PCT No.: PCT/EP2009/061128
§ 371 (c)(1),
(2), (4) Date: Mar. 3, 2011

(87) PCT Pub. No.: WO2010/026105
PCT Pub. Date: Mar. 11, 2010

(65) Prior Publication Data
US 2011/0154672 A1     Jun. 30, 2011
US 2012/0110866 A2     May 10, 2012

(30) Foreign Application Priority Data
Sep. 5, 2008   (EP) .................................... 08163827

(51) Int. Cl.
G01B 5/004       (2006.01)
(52) U.S. Cl. .......................................... 33/503; 33/502
(58) Field of Classification Search ................. 33/503, 33/502
See application file for complete search history.

(56) References Cited

U.S. PATENT DOCUMENTS

| | | | |
|---|---|---|---|
| 4,177,568 A | 12/1979 | Werner et al. | |
| 5,404,649 A | 4/1995 | Hajdukiewicz et al. | |
| 6,307,672 B1* | 10/2001 | DeNure | 359/382 |
| 6,633,051 B1* | 10/2003 | Holloway et al. | 33/503 |
| 7,735,234 B2* | 6/2010 | Briggs et al. | 33/561 |
| 7,952,470 B2* | 5/2011 | Liao et al. | 340/436 |
| 8,125,649 B2 | 2/2012 | Godbillon et al. | |
| 8,253,946 B2* | 8/2012 | Ghislain | 356/480 |
| 2005/0010324 A1* | 1/2005 | Kaever et al. | 700/178 |
| 2010/0149544 A1* | 6/2010 | Ghislain | 356/480 |
| 2011/0154672 A1* | 6/2011 | Jensen et al. | 33/503 |
| 2012/0110866 A2* | 5/2012 | Jensen et al. | 33/503 |

FOREIGN PATENT DOCUMENTS
DE   102007008361 B3   4/2008
EP       0362625 A2   9/1989
EP       0426492 A2   11/1990

* cited by examiner

Primary Examiner — Yaritza Guadalupe-McCall
(74) Attorney, Agent, or Firm — Maschoff Brennan

(57) ABSTRACT

The invention relates to an optical sensor with collision protection for a measurement machine, in particular for a coordinate measurement machine. The optical sensor comprises a sensor-side coupling part for mechanically and optically connecting to the measurement machine, and a sensor element. According to the invention, the sensor comprises a sensor protective coupling as collision protection, said protective coupling comprising a coupling part on the measurement machine side and a coupling part on the sensor element side, wherein a fiber optic cable is routed between the coupling parts of the sensor protective coupling and wherein a fiber optic cable protection element surrounds the fiber optic cable, wherein the ends of the fiber optic cable protection element are fastened to the associated coupling part of the sensor protective coupling.

13 Claims, 5 Drawing Sheets

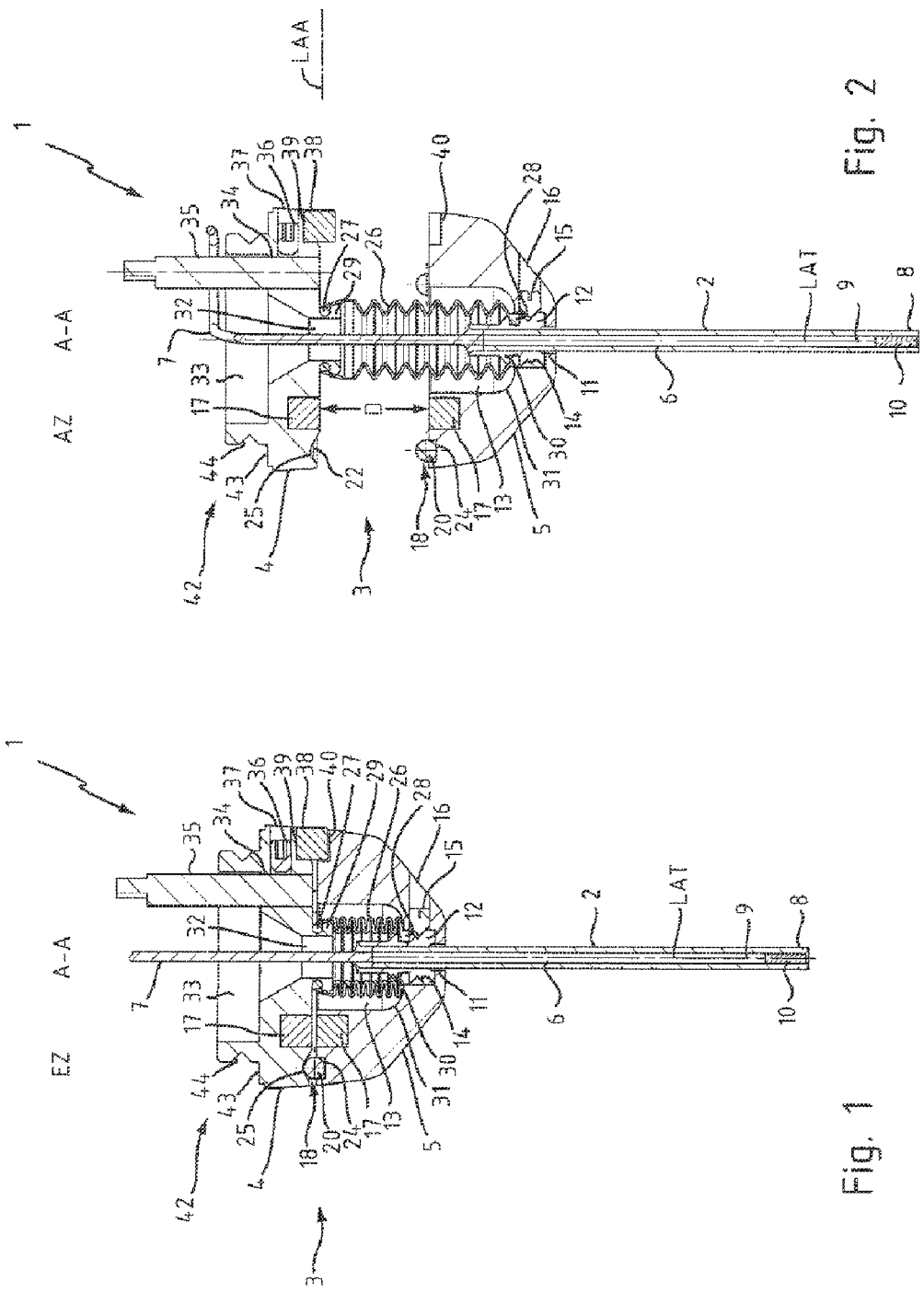

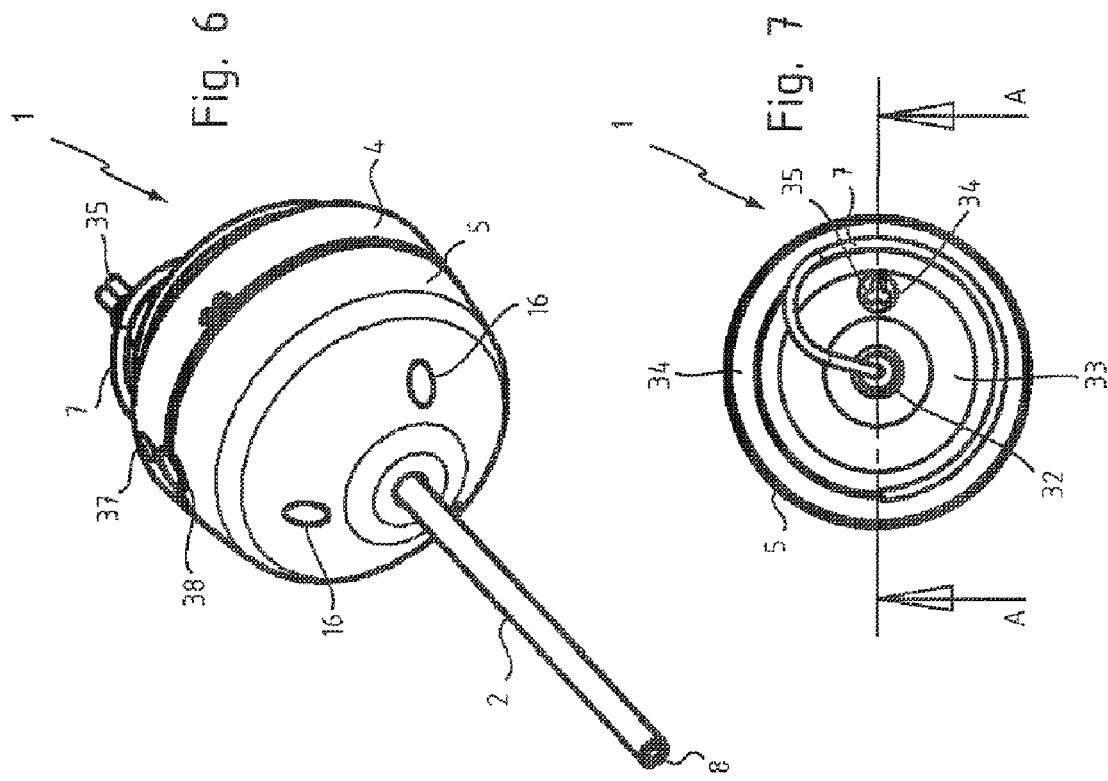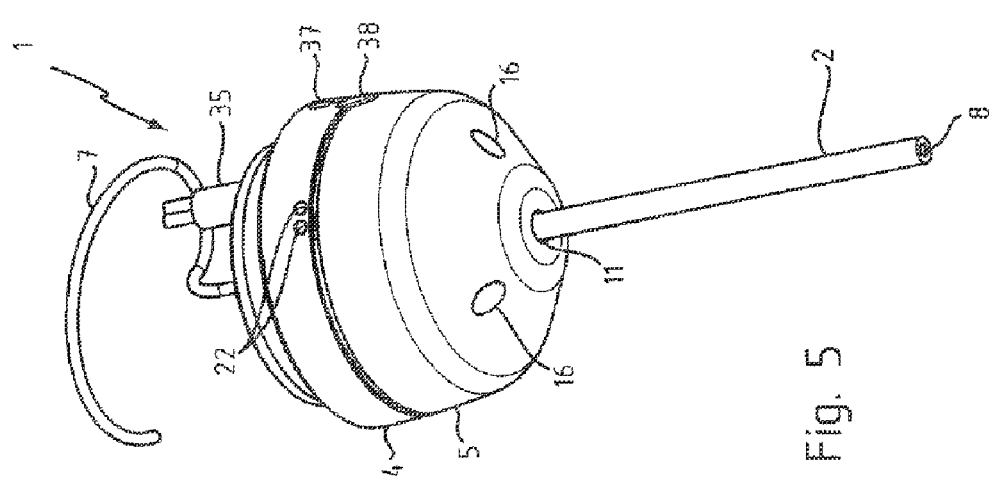

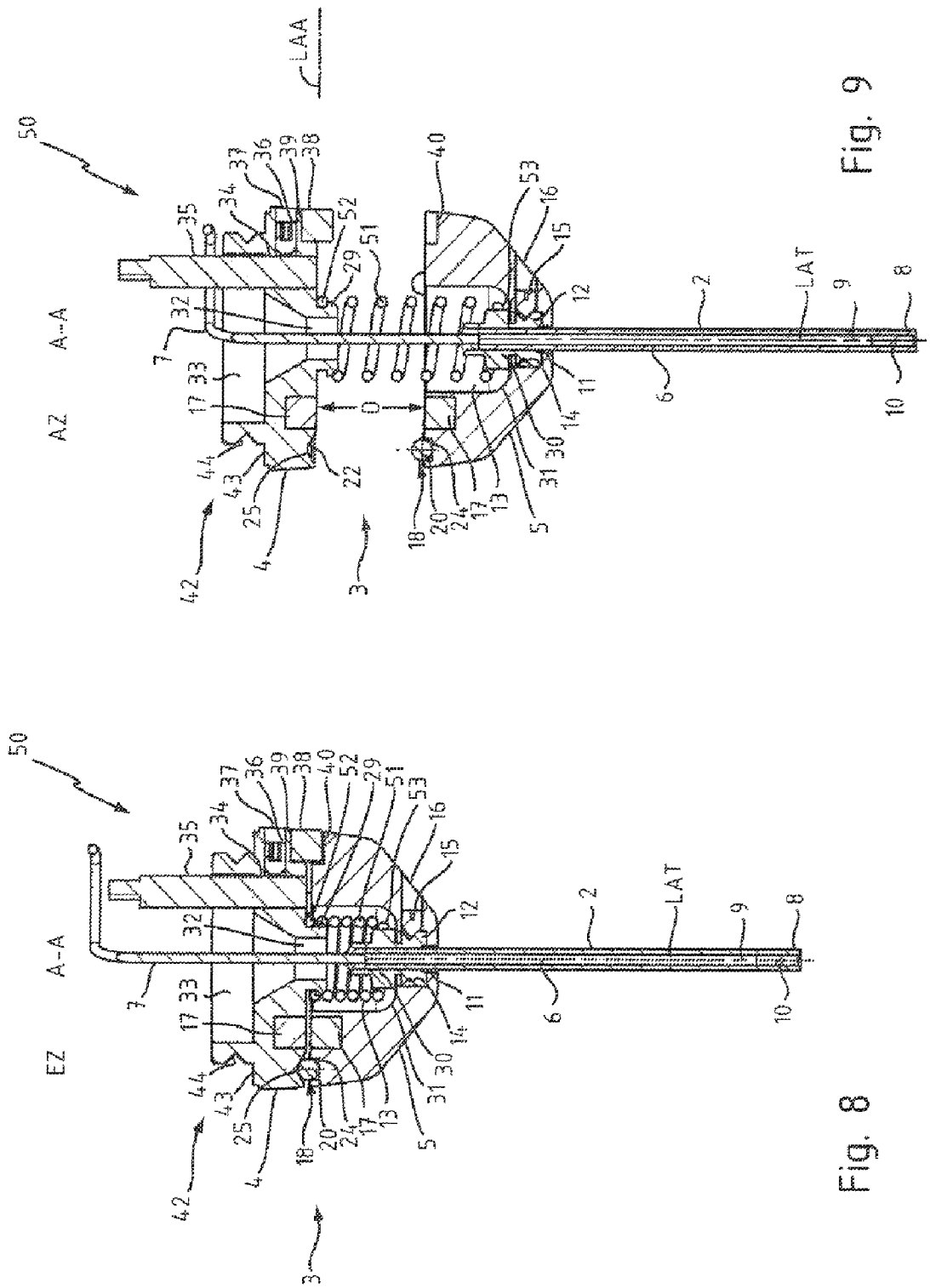

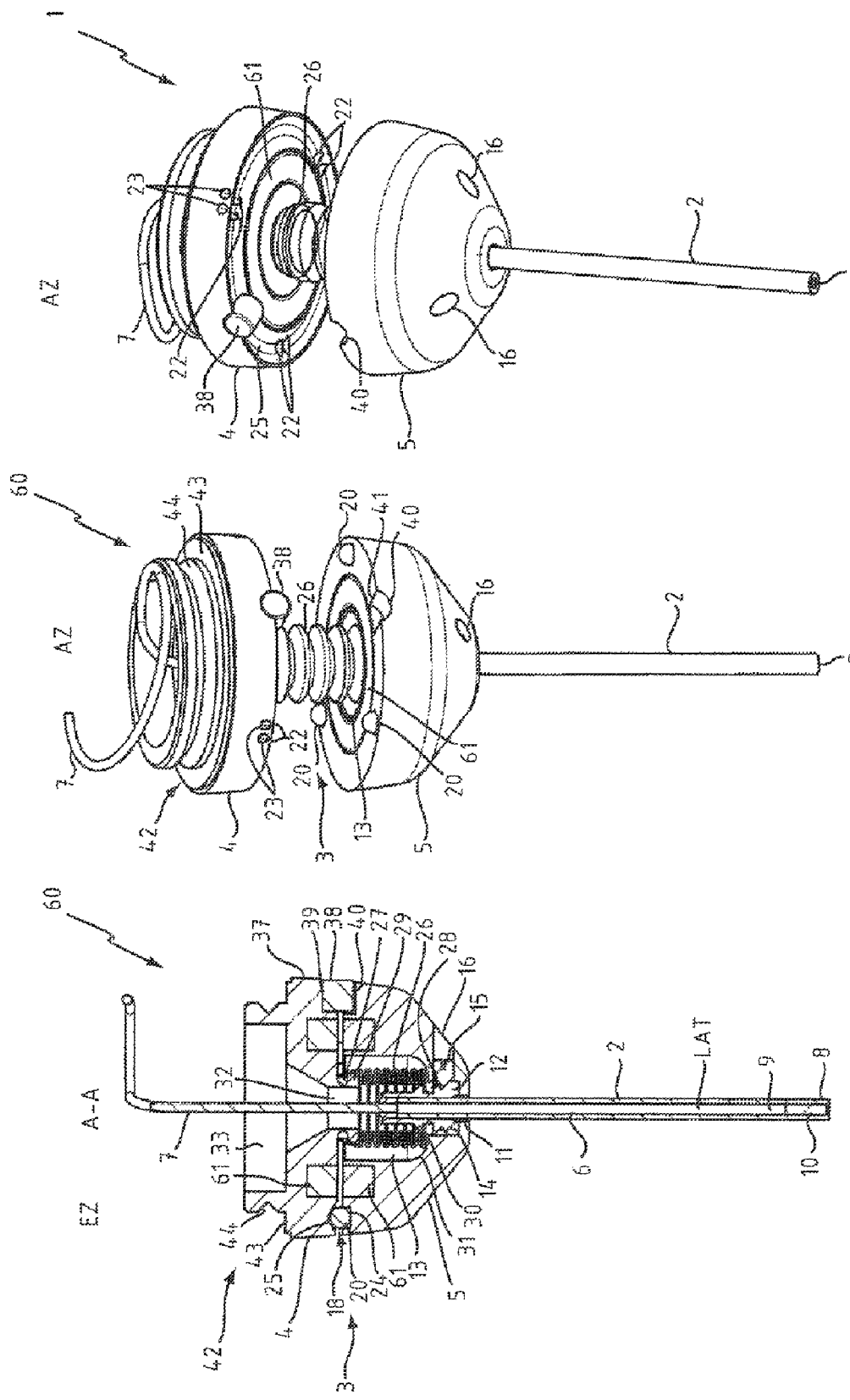

OPTICAL SENSOR WITH COLLISION PROTECTION FOR A MEASUREMENT MACHINE

The invention relates to an optical sensor with collision protection for a measurement machine, in particular for a coordinate measurement machine, which has a sensor-side coupling part for mechanical and optical connection to the measurement machine and has a sensor element.

BACKGROUND

It is known in the prior art for tactile, but not optical, sensors for coordinate measurement machines to be equipped with collision protection. By way of example, EP 0 426 492 A2 discloses a tactile sensor which is intended for continuous measurement of workpieces and has a sensor element which is held in an equilibrium position by restoring forces. The restoring forces are produced by springs. The sensor element is held, preferably magnetically, on a sensor holder via precision bearings, with the restoring forces acting on the sensor holder.

In contrast to this tactile sensor, an optical sensor is moved past the surface of a workpiece to be measured, without touching it. There is therefore no need to hold the sensor in an equilibrium position via restoring forces. In fact, an optical sensor is attached to the sensor holder without any play.

U.S. Pat. No. 5,404,649 discloses a further tactile sensor for a coordinate measurement machine. The sensor is held on a sensor receptacle by a magnet. An isostatic three-point rest is provided between the sensor and the sensor receptacle. The coupling between the sensor and the sensor receptacle is designed such that the sensor is moved away from an initial position in the event of a collision with a workpiece, and snapped back to its initial position because of the magnetic attraction forces when the sensor is free again, irrespective of whether this is because it has moved back or because the workpiece has been removed.

In contrast to the situation with sensors which make contact, optical sensors have optical waveguides which are sensitive to mechanical loading and must be routed in the sensor. The coupling from U.S. Pat. No. 5,404,649 has the disadvantage that the magnet is arranged centrally, making it more difficult to route the optical waveguide in a manner which protects it.

In comparison to the known sensors which make contact, new problems arise for an optical sensor because of the optical waveguide and the fact that the sensor element is not in contact with workpieces to be measured during normal operation.

SUMMARY

Against the background of the prior art, the invention is based on the object of specifying an optical sensor which is not damaged in the event of a collision with a workpiece, and which is distinguished by a long life. Furthermore, it should be possible to replace the sensor easily.

This object is achieved by an optical sensor having the features of patent claim 1. Advantageous embodiments of the optical sensor are specified in the dependent claims 2 to 13.

According to the invention, the optical sensor has a sensor protection coupling as collision protection with a coupling part on the measurement machine side and a coupling part on the sensor element side. An optical waveguide is routed between the coupling parts of the sensor protection coupling. An optical waveguide protection element surrounds the optical waveguide.

In contrast to tactile sensors which make contact, optical sensors are moved past the workpiece to be measured without touching it, and the distance between the optical sensor and the workpiece is measured optically, in particular interferometrically. For this reason, neither the sensor nor the sensor receptacle in the measurement machine has force sensors which detect any deflections of the sensor element as a result of the sensor making contact with the workpiece. Therefore, the optical sensor has virtually no protection in the event of a collision with the workpiece at the side or, at least, it is not possible to determine whether the sensor has collided with the workpiece.

In order to overcome this problem, the collision protection according to the invention has been created, in which a sensor protection coupling is provided in the sensor itself, instead of a protection coupling provided at the junction point between the sensor and the sensor holder on the measurement machine. The sensor protection coupling allows the sensor element to be released from the coupling part on the measurement machine side in the event of a collision, before the sensor element is damaged.

Since a sensitive optical waveguide has to be routed between the sensor element and a control unit for the coordinate measurement machine for optical sensors, said optical waveguide is routed in the interior of the sensor, that is to say between the coupling parts of the sensor protection coupling. Furthermore, the optical waveguide is surrounded by an optical waveguide protection element.

The optical waveguide protection element is attached at one end to the coupling parts of the sensor protection coupling. This ensures that the sensor element cannot be moved indefinitely away from the coupling part on the measurement machine side, when it is released. For spatial reasons, the distance through which the optical waveguide can be pulled out of the coupling part on the measurement machine side is limited. The optical waveguide is protected against excessively severe tension loads by means of an optical waveguide protection element, which is attached at both ends to the respective coupling parts.

The collision protection therefore advantageously lengthens the life of the optical sensor. Furthermore, the separation of the replacement coupling and sensor protection coupling makes it easier to replace the optical sensor.

In order to prevent the optical sensor from being moved further by the coordinate measurement machine once the sensor element has been released, a release sensor can be provided between the coupling parts of the sensor protection coupling, and is preferably coupled to the control unit of the coordinate measurement machine.

The release sensor may be designed to be inductive, capacitive, optical or in the form of an electrical pin contact. This allows a release to be detected electrically, such that further movement of the sensor can be stopped quickly by the coordinate measurement machine in the event of a collision.

A coupling part of the sensor protection coupling expediently has at least one magnet, preferably an electromagnet. The magnet holds the sensor element securely on the coupling part on the measurement machine side, when in the coupled state. If a collision occurs between the optical sensor and a workpiece, the sensor element can be deflected, and can be released from the coupling part on the measurement machine side. When the aim is to move the optical sensor to a free position again, the optical sensor can be coupled again, that is to say the magnetic attraction forces pull the coupling part on the sensor element side back into the coupled state again. A further advantage of electromagnets is that they are lighter than permanent magnets. A further advantage is that the optical measurements of the measurement machine are not influenced by the (electro)magnetic fields.

In a further embodiment, the coupling part has three magnets which are arranged offset through an angle of 120° with respect to the longitudinal axis of the sensor. This arrangement can advantageously be provided in conjunction with an isostatic three-point bearing between the coupling parts. The sensor element is in this way held securely and extremely precisely on the coupling part on the measurement machine side.

It is even more advantageous for the coupling part to have a ring magnet. The ring magnet allows the sensor element to be released uniformly in any direction from the coupling part on the measurement machine side.

The optical waveguide protection element may be a bellows. In particular, the bellows may be composed of rubber. The bellows protect the optical waveguide against excessive mechanical loads, in particular bending loads, and moisture.

In another embodiment, the optical waveguide protection element is a spring prestressed in tension. The spring has the advantages that it can also be used as an alternative to magnetic attachment of the sensor element to the coupling part on the measurement machine side and, in the event of a bending load, prevents kinking loads on the optical waveguide.

However, it is also feasible to provide a compression spring in parallel with the magnetic coupling of the coupling parts. Once the sensor element has been released after a collision, and the sensor element has thus been moved sufficiently far away from the coupling part on the measurement machine side that the attraction force of the magnet decreases, the compression spring forces the sensor element away from the coupling part on the measurement machine side, in order to further reduce the risk of damage to the sensor element.

The sensor protection coupling is preferably designed to couple itself again automatically. This results in the sensor element returning to its initial position after a collision has occurred and it has become free again, for example by movement of the optical sensor in the opposite direction. Therefore, the measurements can then be continued without any further action from the outside. However, in this case, care must be taken to ensure that the optical waveguide protection element is sufficiently stiff and that the distance through which the optical waveguide has been pulled out of the coupling part on the measurement machine side is not too long, in order to prevent damage to the optical waveguide during coupling of the coupling part on the sensor element side. Electromagnets are preferably provided in this embodiment, in order to allow the coupling process to be monitored.

Furthermore, the coupling parts of the sensor protection coupling can rest on one another via a three-point bearing. The three-point bearing ensures that the sensor element is held particularly precisely on the coupling part on the measurement machine side.

An optical measurement beam can be output from the sensor element axially or, by means of additional optical elements such as prisms, also to the side (90°) or in an annular shape.

For interferometric measurement methods, the optical waveguide is preferably in the form of a monomode fiber with a protective casing, a so-called buffer. Other measurement methods, such as chromatically confocal measurement, in fact require a multimode fiber.

Depending on the design of the optics in the sensor element, the measurement beam may be collimated, or else focused for precise lateral scanning of the object. Particularly in the case of chromatically confocal measurement methods, the optics in the sensor element have a wavelength-dependent focus position, in order to make it possible to deduce the object distance subsequently from the coupling efficiency of the signal scattered back from the object.

A defined reference plane may be introduced within the optical sensor for interferometric measurement methods, preferably in the form of a reflection from one of the optics surfaces in order in this way to achieve a short distance between the reference plane and object plane, which then corresponds to the measured distance. This makes it possible to minimize environmental influences. One such measurement method is also known as Common Path Interferometry.

BRIEF DESCRIPTION OF THE DRAWINGS

The invention will be explained in more detail in the following text with reference to exemplary embodiments which are illustrated in the figures, in which:

FIG. 1 shows an optical sensor in the coupled state, in the form of a cross section along the line A-A in FIG. 7;

FIG. 2 shows the optical sensor in the uncoupled state, in the form of a cross section along the line A-A in FIG. 7;

FIGS. 5 and 6 show perspective views of the optical sensor in the coupled state;

FIG. 7 shows a plan view of the optical sensor;

FIGS. 8 and 9 show one embodiment of the optical sensor with an optical waveguide protection element in the form of a spring; and FIGS. 10 to 12 show one embodiment of the optical sensor with ring magnets.

DETAILED DESCRIPTION

Figure 3:
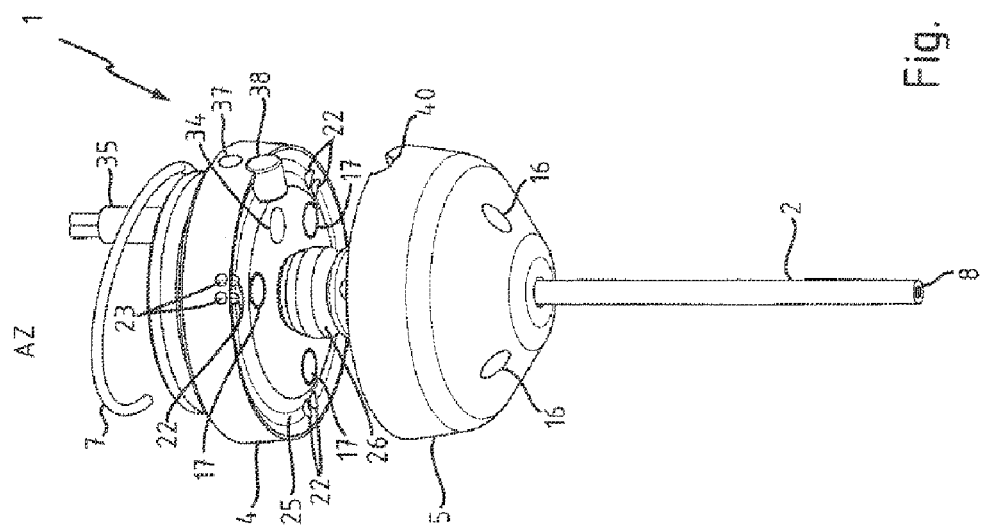
FIGS. 3 and 4 show perspective views of the optical sensor in the uncoupled state.
Figure 4:
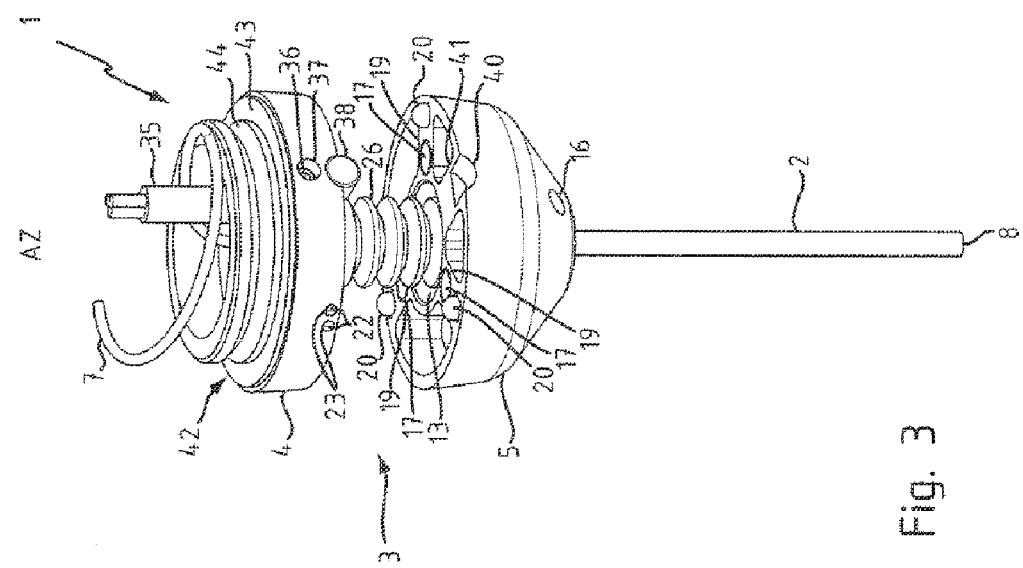

FIGS. 1 to 7 illustrate a detail of an optical sensor for a measurement machine, in particular for a coordinate measurement machine, according to a first embodiment. The sensor 1 has a sensor element 2 and a sensor protection coupling 3. The sensor protection coupling 3 comprises a coupling part 4 on the measurement machine side and a coupling part 5 on the sensor element side.

The sensor element 2 is in the form of a rod and is hollow internally. An optical waveguide 7 is arranged in the interior 6 of the sensor element 2. The optical waveguide 7 starts from a free end 8 of the sensor element 2 and extends through the sensor protection coupling 3 as far as a control unit, which is not illustrated in any more detail, for the coordinate measurement machine. A lens 10, in particular a gradient index lens, is fitted to the end 9 of the optical waveguide 7 in the sensor element 2, in order to widen the beam cross section in comparison to the optical waveguide 7. This lens 10 is located entirely in the interior 6 of the sensor element 2, and ends with the free end 8 of the sensor element 2.

The sensor element 2 projects through an axial hole 11 into the coupling part 5 on the sensor element side, and is held in a bush 12 in the coupling part 5 on the sensor element side. The bush 12 is arranged in a recess 13 in the coupling part 5 on the sensor element side. The bush 12 has a circumferential triangular notch 14, in which grub screws 15 engage. The grub screws 15 are screwed into three threaded holes 16 in the coupling part 5, which threaded holes 16 are arranged offset through an angle of 120° with respect to one another around the longitudinal axis LAT of the sensor 1.

Magnets 17 and an isostatic three-point bearing 18 are provided for coupling the coupling part 5 on the sensor element side to the coupling part 4 on the measurement machine side and are arranged on three webs 19 in the coupling part 5 on the sensor element side, which webs 19 are likewise at an angle of 120° with respect to one another around the longitudinal axis LAT of the sensor 1. Cylindrical magnets 17 are first of all provided in both coupling parts 4, 5 on the outside in the radial direction. The three-point bearing 18 is adjacent to these magnets 17. The three-point bearing 18 has balls 20 in the coupling part 5 on the sensor element side. The balls 20 come to rest on cylindrical pins 22 in the coupling part 4 on the measurement machine side, with each ball 20 being associated with two respective parallel cylindrical pins 22, arranged at a distance from one another. The cylindrical pins 22 are pushed into dowel holes 23 in the coupling part 4 on the measurement machine side, or are adhesively bonded into said dowel holes 23. A cylindrical receptacle 24 is milled into the coupling part 5 in order to hold the balls 20 in the coupling part 5 on the sensor element side. In order to ensure that the balls 20 rest correctly on the cylindrical pins 22, a circumferential trough 25 is provided in the coupling part 4 on the measurement machine side.

In order to protect the optical waveguide 7, an optical waveguide protection element 26, which surrounds the optical waveguide 7, is incorporated in the form of bellows in the sensor protection coupling 3. At their ends 27, 28, the bellows 26 are pushed via lips 29, 30, onto the bush 12 and onto the coupling part 4 on the measurement machine side. When the sensor protection coupling 3 is in the coupled state EZ, as is shown in FIG. 1, the bellows 26 are located virtually entirely in the recess 13 in the coupling part 5 on the sensor element side. This recess 13 tapers in a curved shape at the lower end 31, on the plane of the figure.

The coupling part 4 on the measurement machine side has a central hole 32 which is broadened in the shape of a funnel upwards in the vertical direction and opens into a broad cylindrical receptacle 33. The optical waveguide 7 is passed through the hole 32, but is not attached to the coupling part 4 on the measurement machine side. In consequence, when released (change to the uncoupled state AZ), the optical waveguide 7 can be pulled through the coupling part 4 on the measurement machine side, when the coupling part 5 on the sensor element side has been moved through a distance D away from the coupling part 4 on the measurement machine side. The optical waveguide 7 is routed in a helical shape above the coupling part 4 on the measurement machine side.

Furthermore, the coupling part 4 on the measurement machine side has an eccentric axial hole 34 in the area of the cylindrical receptacle 33. A release sensor 35 is inserted into this axial hole 34. The release sensor 35 is fixed in the coupling part 4 on the measurement machine side by means of a grub screw 36, which is screwed into a radial threaded hole 37, but can alternatively also be adhesively bonded in. The longitudinal axis of the release sensor 38 extends in the radial direction.

The two coupling parts 4, 5 are precentered, and protected against rotation, by an alignment cylinder 38. The alignment cylinder 38 is held in a half-cylindrical receptacle 39, in particular by being adhesively bonded into it. The longitudinal axis of the alignment cylinder 38 extends in the radial direction. When the sensor protection coupling 3 is in the coupled state EZ, the alignment cylinder 38 projects into a further half-cylindrical recess 40 in the coupling part 5 on the sensor element side, with this recess 40 being arranged in a fourth web 41.

Furthermore, the optical sensor 1 has a receptacle part which is not illustrated in any more detail but can be attached, such that it can be replaced, via a standard receptacle to a movable measurement arm of the measurement machine. The coupling part 4 on the measurement machine side can be attached to the receptacle part via an attachment flange 42. For this purpose, the coupling part 4 on the measurement machine side has a double step 43, and a circumferential triangular notch 44.

FIGS. 8 and 9 illustrate one embodiment of the optical sensor 50, which differs from the previous embodiment in that the optical waveguide protection element 51 is a spring prestressed in tension. At its ends 52, 53, the spring 51 is attached to lips 29, 30 on the coupling parts 4, 5. The spring 51 limits the distance D through which the coupling part 5 on the sensor element side can be moved away from the coupling part 4 on the measurement machine side when it is released. Furthermore, the prestressed spring 51 holds the coupling part 5 on the sensor element side in the coupled state EZ, as a result of which this embodiment does not require any magnets.

In addition, the same features in FIGS. 8 and 9 are provided with identical reference symbols.

According to a further embodiment, which is not illustrated, of an optical sensor, the spring 51 is surrounded by a bellows 26.

FIGS. 10 to 12 illustrate one embodiment of the optical sensor 60, which differs from the embodiment shown in FIGS. 1 to 7 in that the magnets 61, 62 are in the form of ring magnets. This means that there is no need for the webs and the release sensor with the associated hole and attachment screw.

In addition, the same features in FIGS. 10 to 12 are provided with identical reference symbols.

LIST OF REFERENCE SYMBOLS

1—Sensor
2—Sensor element
3—Sensor protection coupling
4—Coupling part on the measurement machine side
5—Coupling part on the sensor element side
6—Interior of 2
7—Optical waveguide
8—End of 2
9—End of 7
10—Lens
11—Axial hole
12—Bush
13—Recess
14—Notch
15—Grub screw
16—Threaded hole
17—Magnet
18—Three-point bearing
19—Web
20—Ball
22—Cylindrical pin
23—Dowel hole
24—Receptacle
25—Trough
26—Optical waveguide protection element, specifically bellows
27—End of 26
28—End of 26
29—Lip
30—Lip
31—End of 13

32—Hole
33—Receptacle
34—Axial hole
35—Release sensor
36—Grub screw
37—Threaded hole
38—Alignment cylinder
39—Half-cylindrical receptacle
40—Half-cylindrical receptacle
41—Web
42—Attachment flange
43—Step
44—Notch
50—Sensor
51—Optical waveguide protection element, specifically spring
52—End of 51
53—End of 51
60—Sensor
61—Ring magnet
62—Ring magnet
AZ—Uncoupled state
D—Distance
EZ—Coupled state
LAA—Longitudinal axis of 38
LAT—Longitudinal axis of 1

What is claimed is:

1. An optical sensor with collision protection for a coordinate measurement machine, the optical sensor comprising:
 a sensor-side coupling part for mechanical and optical connection to the measurement machine;
 a sensor element;
 a sensor protection coupling as collision protection with a coupling part on the measurement machine side; and
 a coupling part on the sensor element side, wherein:
  an optical waveguide is routed between the coupling parts of the sensor protection coupling;
  an optical waveguide protection element surrounds the optical waveguide, and
  the ends of the optical waveguide protection element are attached to the associated coupling parts of the sensor protection coupling.

2. The sensor as claimed in claim 1, wherein the sensor protection coupling has a release sensor.

3. The sensor as claimed in claim 1, wherein the release sensor is designed to be inductive, capacitive, optical or in the form of an electrical pin contact.

4. The sensor as claimed in claim 1, wherein a coupling part the sensor protection coupling has at least one magnet, preferably an electromagnet.

5. The sensor as claimed in claim 4, wherein the coupling part has three magnets which are arranged offset through an angle of 120° with respect to the longitudinal axis of the sensor.

6. The sensor as claimed in claim 4, wherein the coupling part has a ring magnet.

7. The sensor as claimed in claim 1, wherein a coupling part the sensor protection coupling has at least one electromagnet.

8. The sensor as claimed in claim 1, wherein the optical waveguide protection element is bellows.

9. The sensor as claimed in claim 1, wherein the optical waveguide protection element is a spring prestressed in tension.

10. The sensor as claimed in claim 9, wherein the sensor protection coupling is designed to couple itself again automatically.

11. The sensor as claimed in claim 1, wherein the coupling parts of the sensor protection coupling rest on one another via a three-point bearing.

12. The sensor as claimed in claim 1, wherein the optical waveguide is a monomode fiber.

13. The sensor as claimed in claim 1, wherein the optical waveguide is a multimode fiber.

\* \* \* \* \*